US012749046B2

(12) United States Patent
Rosenfeld et al.

(10) Patent No.: US 12,749,046 B2
(45) Date of Patent: Sep. 29, 2026

(54) RESOURCE MANAGEMENT

(71) Applicant: Jane Technologies, Inc., Santa Cruz, CA (US)

(72) Inventors: Socrates Munaf Rosenfeld, Santa Cruz, CA (US); Abraham Munaf Rosenfeld, Santa Cruz, CA (US); Howard Hong, Walnut Creek, CA (US); Simon James Roddy, Marina Del Rey, CA (US); Andrew Michael Livingston, Napa, CA (US); Justin McPherson Laing, Santa Cruz, CA (US); Jared Travis Marr, Atlanta, GA (US); Benjamin Aaron Green, Lahaina, HI (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

(21) Appl. No.: 19/043,735

(22) Filed: Feb. 3, 2025

(65) Prior Publication Data

US 2025/0259140 A1 Aug. 14, 2025

Related U.S. Application Data

(60) Provisional application No. 63/551,561, filed on Feb. 9, 2024.

(51) Int. Cl.
*G06Q 10/087* (2023.01)

(52) U.S. Cl.
CPC .................................. *G06Q 10/087* (2013.01)

(58) Field of Classification Search
CPC .. G06Q 30/02; G06Q 10/087; G06Q 30/0601; G06Q 30/06; G06Q 20/203;
(Continued)

(56) References Cited

U.S. PATENT DOCUMENTS 6,370,515 B1 * 4/2002 Diamond ........... G06Q 10/0875 705/28
7,127,458 B1 * 10/2006 Mantripragada ........................... G06F 16/90344
(Continued)

FOREIGN PATENT DOCUMENTS

WO WO 98/03923 A1 1/1998

OTHER PUBLICATIONS

Amazon.com [online], "Dog Bed", published on or before Apr. 21, 2021, retrieved on May 13, 2021, retrieved from URL<https://www.amazon.com/s?k=dog+bed&ref=nb_sb_noss>, 12 pages.
(Continued)

*Primary Examiner* — Florian M Zeender
*Assistant Examiner* — Vanessa Deligi
(74) *Attorney, Agent, or Firm* — Fish & Richardson P.C.

(57) ABSTRACT

Methods, systems, and apparatus, including computer programs encoded on computer storage media, for determining a recommended object from a subset of relevant objects. One of the methods includes receiving, from a central system, a list of identifiers for candidate data objects. A subset of data objects that are identified on the list of identifiers and that are maintained in a local database is determined using the list of identifiers and data for the subset of data objects. A recommended data object is selected from the subset of data objects. Information about the recommended data object is presented.

22 Claims, 7 Drawing Sheets

(58) Field of Classification Search

CPC ............... G06Q 30/00; G06Q 30/0201; G06Q 30/0255; G06Q 30/0251; G06Q 50/01; G06Q 30/0641; G06Q 20/20; G06Q 10/08; G06Q 20/3276; G06Q 30/0238; G06Q 50/14; G06Q 20/201; G06Q 30/0273; G06Q 30/0635; G06Q 10/0875

See application file for complete search history.

(56) References Cited

U.S. PATENT DOCUMENTS

| | | | | |
|---|---|---|---|---|
| 9,792,597 | B1 * | 10/2017 | Jen | G06Q 20/202 |
| 11,922,466 | B2 | 3/2024 | Rosenfeld et al. | |
| 11,995,691 | B2 | 5/2024 | Rosenfeld et al. | |
| 2003/0200155 | A1 * | 10/2003 | Ouchi | G06Q 30/0641 705/26.62 |
| 2005/0010494 | A1 * | 1/2005 | Mourad | G06Q 30/02 705/26.8 |
| 2007/0198354 | A1 * | 8/2007 | Senghore | G06Q 30/02 705/14.27 |
| 2008/0082427 | A1 * | 4/2008 | Gandhi | G06Q 10/087 705/28 |
| 2013/0232431 | A1 * | 9/2013 | Hipsher | G06Q 30/02 715/771 |
| 2013/0311337 | A1 * | 11/2013 | Stoll | G06Q 30/0214 705/26.81 |
| 2020/0234325 | A1 * | 7/2020 | Hoque | G06Q 20/3829 |
| 2021/0350432 | A1 * | 11/2021 | Kushner | G06N 3/048 |

OTHER PUBLICATIONS

Doordash.com [online], “Run Your Own Marketing on DoorDash”, published on or before Apr. 21, 2021, retrieved on May 13, 2021, retrieved from URL<https://help.doordash.com/merchants/s/article/Run-Your-Own-Marketing-on-DoorDash?language=en_US>, 7 pages.

Facebook.com [online], “Reach Out to Future Customers and Fans”, published on or before Apr. 21, 2021, retrieved on May 13, 2021, retrieved from URL<https://www.facebook.com/business/ads>, 9 pages.

Google.com [online], “Dog Beds”, published on or before Apr. 21, 2021, retrieved on May 13, 2021, retrieved from URL<https://www.google.com/search?q-dog+beds&sxsrf=ALeKk03UzuEK9F1ly4WpEa1YCjBGDuAI4g%3A1620603320264&source=hp&ei=uHGYYKP5DMzP0PEPx9O0GA&iflsig=AINFCbYAAAAAYJh_yPVQ5dvq_9fyLmQvGnxR5-OuVJW-&oq=dog+beds&gs_lcp-Cgdnd3Mtd216EAMyBAgjECcyAggAMgIIADICCAAyAggAMgIIADIFCAAQyQMyAggAMgUIABCSAzICCAA6CAguEMcBEKMCOgIILjoKCC4QxwEQrwEQJICqNlibQGCwQ2gAcAB4AIABd4gBIQWSAQM3LjGYAQCgAQGqAQdnd3Mtd216&sclient=gws-wiz&ved-0ahUKEwijteTp4b3wAhXMJzQIHccpCgMQ4dUDCAs&uact-5>, 4 pages.

Homedepot.com [online], “Connect Your Brand To Our Customers”, published on or before Apr. 21, 2021, retrieved on May 13, 2021, retrieved from URL<https://www.homedepot.com/c/Retail_Media Advertising_Solutions>, 13 pages.

Leafly.com [online], “The place for weed”, published on or before Apr. 21, 2021, retrieved on May 13, 2021, retrieved from URL<https://www.leafly.com/>, 7 pages.

Spotify.com [online], “Listening is everything”, published on or before Apr. 21, 2021, retrieved on May 13, 2021, retrieved from URL<https://www.spotify.com/us/>, 3 pages.

Weedmaps.com [online], “Dispensary Regions”, published on or before Apr. 21, 2021, retrieved on May 13, 2021, retrieved from URL<https://weedmaps.com/>, 5 pages.

Yelp.com [online], “Best 10 Restaurants near Downtown, San Jose, CA”, published on or before Apr. 21, 2021, retrieved on May 13, 2021, retrieved from URL<https://www.yelp.com/search?cflt-restaurants&find_loc=Downtown%2C+San+Jose%2C+CA>, 5 pages.

* cited by examiner

600

RESOURCE MANAGEMENT

CLAIM OF PRIORITY

This application claims priority to U.S. Patent Application Ser. No. 63/551,561, filed on Feb. 9, 2024, the entire contents of which are hereby incorporated by reference.

BACKGROUND

Various entities maintain databases of data. Sometimes when entities work together, they can share data. However, differences in systems and communication features can make communication between disparate systems difficult. For instance, if one entity's system does not have an application programming interface, that entity might not be able to automate data communication with another entity.

SUMMARY

In general, one aspect of the subject matter described in this specification can be embodied in methods that include the actions of receiving, from a central system, a list of identifiers for candidate data objects; determining, using the list of identifiers and data for data objects maintained in a local database, a subset of data objects that are identified on the list of identifiers for candidate data objects and maintained by the local database; selecting, from the subset of data objects, a recommended data object; and causing presentation of information about the recommended data object.

In general, one aspect of the subject matter described in this specification can be embodied in methods that include the actions of providing, to a central system that maintains a database of data objects used by a plurality of entity systems each of which maintain a corresponding local database, a request that identifies an item for which the system requires additional information to store an entry in a local database; in response to providing the request, receiving, from the central system, a list of one or more candidate data objects for the item, each of the candidate data objects included different predetermined data for a corresponding item; selecting, from the list of one or more candidate data objects, a data object for the item; storing, in the local database, the entry for the item using the data object; receiving, from the central system, a second list of identifiers for candidate data objects; determining, using the second list of identifiers and data for data objects maintained in the local database, a subset of data objects that are identified on the second list of identifiers for candidate data objects and maintained by the local database; selecting, from the subset of data objects, a recommended data object; and causing presentation of information about the recommended data object.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, each of the one or more candidate data objects on the list has a common type that was determined using the request. Selecting the data object from the list of one or more candidate data objects can include determining that a global identifier from the central system and for the data object maps to a local identifier for the local database.

In some implementations, selecting the data object from the list of one or more candidate data objects can include determining that a name for the item satisfies a similarity criterion for a data object name included in the data object. The name can include at least one of an item name or a brand name.

In some implementations, selecting the data object from the list of one or more candidate data objects can include receiving input data that identifies a selection of the data object from the list of one or more candidate data objects.

In some implementations, the method can include determining, for one or more fields of the data object for the item for which the data object does not include predetermined data, input data for the field. Storing the entry for the item in the local database can use the data object, the predetermined data, and the input data. Determining the input data can include receiving the input data from an input device.

In some implementations, receiving the list can include receiving the list of the one or more candidate data objects that i) were determined using a description of the item as a search parameter in the database of the central system and ii) each satisfied a confidence criterion that the corresponding data object includes predetermined data for the item.

In some implementations, the local database for a first entity can maintain entries for one or more first data objects that are different data objects than one or more second data objects used for entries in a second, different database for a second entity.

In some implementations, each data object maintained in the local database can include data for a corresponding item provided by an entity that maintains the local database. The local database can be an inventory database for the entity and can include at least some of the items represented by the data objects in the local database are in stock at a physical location for the entity.

In some implementations, the method can include receiving, from the central system, a second list of identifiers for candidate data objects; determining, using the second list of identifiers and data for data objects maintained in the local database, a subset of data objects that are identified on the second list of identifiers for candidate data objects and maintained by the local database; selecting, from the subset of data objects, a recommended data object; and causing presentation of information about the recommended data object In some implementations, the method can include receiving the list of identifiers comprises receiving a list of global identifiers for the central system. Determining the subset of data objects can include: determining, for at least some identifiers from the global list of identifiers, a corresponding local identifier using a mapping of global identifiers for the central system to local identifiers for the local database; determining, using the local identifiers that were mapped to corresponding global identifiers from the list of global identifiers and data from the local database, whether an item for the corresponding local identifier is in stock at a physical location for an entity that maintains the local database; and selecting, as the subset of data objects, the data objects for the items that are in stock at the physical location for the entity.

In some implementations, the method can include, after causing presentation of the information about the recommended data object on a first display, receiving data indicating selection of a menu option to present the information about the recommended data object on a second, different display; and causing presentation of the information about the recommended data object on the second, different display.

In some implementations, selecting the recommended data object from the subset of data objects can use data indicating selection, in a user interface, of the recommended data object from the subset of data objects.

In some implementations, selecting the recommended data object from the subset of data objects can use data for the entity that maintains the local database.

In some implementations, selecting the recommended data object from the subset of data objects can use at least one of a list of items with which an item represented by the recommended data object is offered, historical online item interaction data, historical transaction data for a physical location, or a device identifier for which the list of identifiers was received.

In some implementations, each data object maintained in the local database can include data for a corresponding item provided by an entity that maintains the local database. The local database can be an inventory database for the entity and can include at least some of the items represented by the data objects in the local database are in stock at a physical location for the entity.

In some implementations, the method can include providing, to the central system that maintains the database of data objects used by a plurality of entity systems each of which maintain a corresponding local database, a request that identifies an item for which the local system requires additional information to store an entry in the local database; in response to providing the request, receiving, from the central system, a second list of one or more candidate data objects for the item, each of the candidate data objects included different predetermined data for a corresponding item; selecting, from the second list of one or more candidate data objects, a data object for the item; and storing, in the local database, the entry for the item using the data object.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can reduce, compared to other systems, a likelihood of errors between systems that share at least some common data, e.g., using a list of one or more candidate data objects for an item. In some implementations, the systems and methods described in this specification can increase an accuracy of entries stored in a database, reduce computational resource usage for entity systems, or a combination of both, compared to other systems, e.g., by storing, in a local database, an entry for an item using a data object received from a central system. This can reduce computational resource usage by reducing an amount of input requested from a user for the entry compared to other systems.

In some implementations, the systems and methods described in this specification can have reduced network communications compared to other systems, e.g., by selecting a recommended data object from a list of recommended data objects received across a network. In some implementations, the systems and methods described in this specification can provide more accurate recommendations compared to other systems, e.g., using a list of recommendations generated using data objects stored at a central system which includes data objects both included in a local database for an entity and in other databases for other entities.

BRIEF DESCRIPTION OF THE DRAWINGS

Like reference numbers and designations in the various drawings indicate like elements.

DETAILED DESCRIPTION

Figure 1:
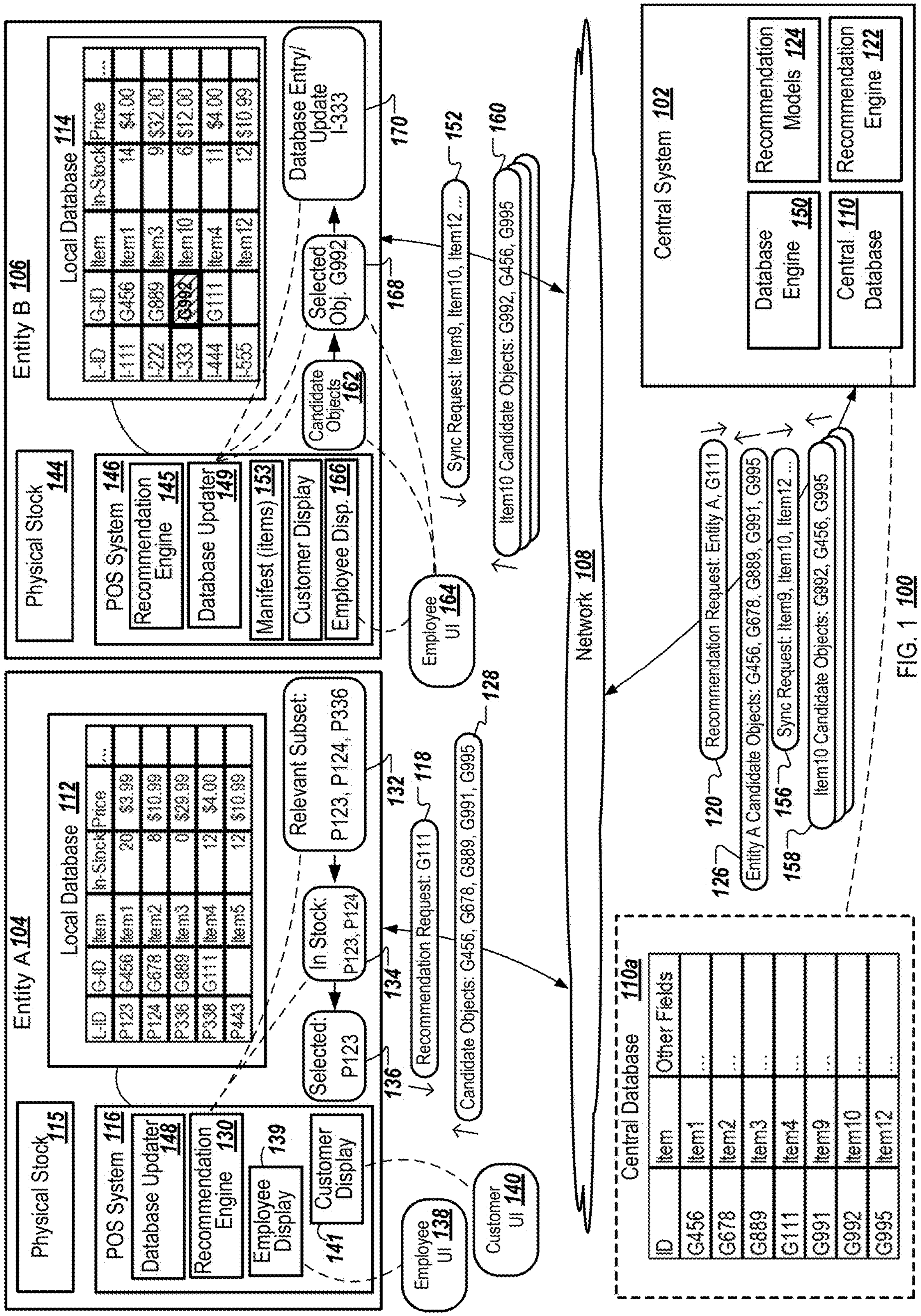
FIG. 1 depicts an example environment for product recommendations.

Sometimes systems include common data, whether for a local version with faster access, that includes additional data, e.g., when a central system does not need all data for a data object, or a combination of both. This can occur when a central system maintains data objects for multiple separate entity systems, each of which have a local version of only some of the data from the central system. The local versions can be for different data objects, e.g., different tables in a database, different entries in a table, different tables, or a combination of these. In some examples, the central system might include a subset of the common data for a data object, e.g., that identifies one or more first common values for the data objects, such as an object name, while an entity system might include additional data such as one or more second values that are not necessarily common to different entity systems. Some examples of the first common values can include a global identifier shared by the systems, a product name, a brand name, a product type or sub-type, a description, an image, and a uniform resource identifier ("URI"). Some examples of second values can include resource values, e.g., inventory values, stock keeping units ("SKUs"), and other appropriate values, e.g., related to inventory or other appropriate types of resources.

Sometimes some of the systems might not have a common identifier for the data objects even though different instances of the items represented by the data objects are substantially the same. This can occur when the local systems do not have an agreed upon identification system, the items have minor variations that are not substantive, or both.

When an entity system receives new data, that entity system needs to synchronize that data with the central system. However, if different entity systems refer to the same data object in different ways as part of a data ingestion process, the central system needs a global identifier to refer to the same data object, data objects that represent substantially the same item, or both, in a consistent manner and a way to determine when an entity system refers to a particular data object for which the central system already maintains data. This can reduce a likelihood of duplicate data in the central system that would otherwise be represented by the same data object, e.g., when each of multiple entity systems have different local identifiers. In some examples, different entity systems can store a same local identifier for a same item.

In some implementations, the central system can analyze, for each item from a manifest for an entity system, data for the item. The data can include an identifier for the item, a name for the item, other appropriate data, or a combination of these. The central system can determine, using a result of the analysis, a set of data objects that satisfy a confidence threshold for the item, e.g., that the data object includes data for the item.

The entity system receives a list of the set of data objects that satisfy a similarity threshold for the item. The entity system selects a data object from the list and associates the item with the data object. The association can occur by storing an entry in an entity database indicating the second values for the data object, e.g., for which the data object did not have predefined values. In some examples, the entity system can store a mapping, e.g., in the data object, of the local identifier for the entity system to the global identifier for the central system. The entity system can then communicate with the central system using the corresponding global identifier instead of another identifier, e.g., a SKU or another local identifier. This can improve communication between the systems by sharing common information, reduce computational resource usage, e.g., that might be required by communicating with a different identifier, or both.

In some implementations, the entity system can request, from the central system, a recommendation for related data objects, e.g., as part of a transaction. The entity system can include the global identifier as part of this request. The central system can respond with a list of data objects, e.g., data object identifiers, that indicate recommended data objects. Since the entity system might not have data for all data objects maintained by the central system, and some of these not included data objects might be included in the list, the entity system can determine which of the data objects are available, e.g., using a mapping that indicates which of the data objects are maintained by the entity system. In this way, the central system can reduce memory usage, by not duplicating all information stored on an entity system, while enabling communication about common data objects across multiple entity systems. The mapping can include a list of, e.g., local, SKUs and, for at least some of the SKUs, a corresponding global identifier.

FIG. 1 depicts an example environment 100 for product recommendations. The environment 100 includes a central system 102 and various entities, such as an entity A 104 and an entity B 106. The entity A 104 and the entity B 106 can communicate with the central system 102 over a network 108, e.g., using corresponding computers at or otherwise associated with the corresponding entity.

The central system 102 has a central database 110. In some examples, the entity A 104 and the entity B 106 are retailers and the central system 102 provides, among possibly other services, access to the central database 110 as a central product catalog. Each entity in the environment 100 can have a local database. For example, the entity A 104 has a local database 112 and the entity B has a local database 114. The local database 112 and the local database 114 can be, at least in part, inventory databases for the entity A 104 or the entity B 106, respectively.

The central database 110 can store common data that may be common or applicable to multiple of the entities in the environment 100. For instance and as shown in example central database entries 110*a*, the central database 110 can store, for each of multiple items, a global identifier of the item, an item name, and other common item attributes, such as an item image, brand name, product category, or any combination of these.

A given local database can store values that are not necessarily common to different entity systems. For example, the local database 112 of the entity A 104 stores local identifiers, in-stock information (e.g., for physical stock 115 at the entity A 104), and price information (e.g., in L-ID, In-Stock, and Price columns, respectively). The values in the L-ID, In-Stock, and Price columns can be specific to the entity A 104. Similarly, the local database 114 can include values in L-ID, In-Stock, and Price columns that are specific to the entity B 106. Each of the local database 112 and the local database 114 store global identifiers and item names in G-ID and Item columns, respectively. Global identifiers can be populated into a respective local database using a database sync procedure, as described below. Although the local database 112 and the local database 114 are shown as having same column names, in some implementations, some column names are different between the local database 112 and the local database 114.

The central database 110 can store entries keyed by a global identifier field. For example, the example central database entries 110*a* include entries with global identifiers G456, G678, G889, G111, G991, G992, and G995. A given local database of a respective entity, such as the local database 112 or the local database 114, can store entries that collectively have a subset of global identifiers that are stored in the central database 110. For example, the local database 112 includes entries that have global identifier values of G456, G678, G889, and G111 and the local database 114 includes entries that have global identifier values of G456, G889, G992, and G111.

A given entity can include a global identifier when sending requests to the central system 102. For example, entities can send a request, with a global identifier, to the central system 102, for a recommendation for related data objects that are related to a product with the global identifier, e.g., as part of a transaction. For example, a POS (Point-of-Sale) system 116 of the first entity 104 may be managing a transaction for a person for an instance of an item with an item name of Item4, a global identifier value of G111, and a local identifier value of P338. The POS system 116 can send a recommendation request 118 to the central system 102 for recommendations for other items that may be of interest to the person.

The central system 102 can receive the recommendation request 118 as a recommendation request 120. The recommendation request 120 can include the G111 global item identifier and may also include an indication of the entity A 104 and an account identifier of a person who initiated the transaction. A recommendation engine 122 of the central system 102 can generate a recommendation in response to the recommendation request 120, for example using one or more recommendation models 124. The recommendation generated by the recommendation engine 122 can include a list of candidate objects (e.g., items) that may be of interest to the person, e.g., based on the person purchasing the item with global identifier of G111, based on a purchase history of the person (e.g., online purchases that may be managed, as least in part, by the central system 102 or a system connected to the central system 102), purchases that other people have made when buying the G111 item, what people similar to the person have purchased, or any combination of these.

The recommendation engine 122 can generate and send a recommendation 126 to the entity A 102. The recommendation 126 identifies a set of candidate objects with global identifier values of G456, G678, G889, G991, and G995. In some examples, the recommendation 126 includes respective recommendation scores for each candidate data object that are provided by the recommendation engine 122. The POS system 116 can receive the recommendation 126 as a recommendation 128. The list of candidate objects in the recommendation 128 can include objects associated with items that are not carried by the entity A 104, e.g., not in a physical stock 115 for the entity A 104. Accordingly, a recommendation engine 130 of the POS system 116 can determine, from among the candidate objects in the recommendation 128, a relevant subset 132. For example, the recommendation engine 130 can determine, using the list of global identifiers in the recommendation 128 and data maintained in the local database 112, the relevant subset 132 as a subset of the candidate data objects that are maintained by the local database 112, in the physical stock 115, or both.

In further detail, the recommendation engine 130 can determine the relevant subset 132 by determining, for at least some identifiers from the list of global identifiers in the recommendation 128, a corresponding local identifier using mapping information in the local database 112 that maps global identifiers to local identifiers for the local database 112. The mapping information can include local identifier values in the L-ID column being mapped to corresponding global identifier values in the G-ID column, for example. For instance, the recommendation engine 130 can determine that the global identifiers G456, G678, and G889 that are included in the recommendation 128 respectively map to the local identifiers P123, P124, and P336 in the relevant subset 132. The recommendation engine 130 can determine that other global identifiers in the recommendation 128 (e.g., global identifiers G991 and G995) do not map to any local identifier in the local database 112 and therefore do not have a corresponding entry in the relevant subset 132. The entity A 104 might not carry Item9 and Item12 items that correspond to the global identifiers G991 and G995, respectively, for example.

The recommendation engine 130 can filter the relevant subset 132 into an in-stock subset 134 by determining which items of the relevant subset 132 are in stock at the entity A 102. For example, the recommendation engine 130 can query the local database 112 to determine, using the in-stock data for the physical stock 115, which entries corresponding to the local identifiers of the relevant subset 132 have a positive inventory count and which have a zero inventory count. For example, the recommendation engine 130 can determine that the Item3 item with a local identifier of P336 and global identifier of G889 currently has a zero inventory count. Accordingly, the recommendation engine 130 can exclude the Item3 item from the in-stock subset 134 but include items with local identifiers of P123 and P124 in the in-stock subset 134 based on those items having positive inventory counts.

In some examples, the recommendation engine 130 may exclude items from the in-stock subset 134 based on other rules. For instance, items in the relevant subset 132 may be excluded from the in-stock subset 134 if an item price of the item does not satisfy, e.g., exceeds, a predetermined threshold. For example, the recommendation engine 130 may be configured to eventually provide, for a current transaction, recommendations for additional items that have an item price less than $30.

The recommendation engine 130 can select a selected item 136 (e.g., corresponding to local identifier of P123) from the in-stock subset 134. In some cases, the recommendation engine 130 automatically selects one of the in-stock items in the in-stock subset 134 as the selected item 136, such as based on a highest recommendation score received from the central system and/or based on local rules (e.g., where local rules may include selection based on local data local to the entity A 104, such as in-store purchase history of the user).

In some examples, the recommendation engine 130 receives information indicating a user selection of a particular in-stock item as the selected item 136. For example, the recommendation engine 130 can provide information for multiple items of the in-stock subset 134 for presentation of recommended items in an employee user interface 138 that is displayed on an employee display 139 of the POS system 116. The multiple items presented in the employee user interface 138 can be all of the items in the in-stock subset 134, a maximum of a predetermined number (e.g., five) of the items in the in-stock subset 134, only items in the in-stock subset 134 that have a recommendation score that satisfies, e.g., is above, a threshold, or any combination of these.

An employee can select, in the employee user interface 138, one of the presented recommend items. In some examples, selection of a presented recommended item can include the employee verbally asking the person making the purchase whether they would like the presented recommended item. In response to the person responding affirmatively, the employee can select the presented recommended item in the employee user interface 138 and the item can be added to the current transaction (with the presented recommended item also being physically retrieved and provided to the person and also possibly scanned using the POS system 116).

In some examples, in response to the employee selecting a presented recommended item in the employee user interface 138, information for that item is provided for presentation in a customer user interface 140 that is displayed on a customer display 141. Both the employee and the customer/user may each have a separate display, for example. In some cases, a presented recommended item on the customer user interface 140 is user-selectable, and in response to selection of the presented recommended item in the customer user interface 140, that item can be added to the order. In some examples, the customer/user can verbally inform the employee to add the presented recommended item to the order, and the employee can retrieve that item and that item can be scanned and added to the order.

Figure 2A:
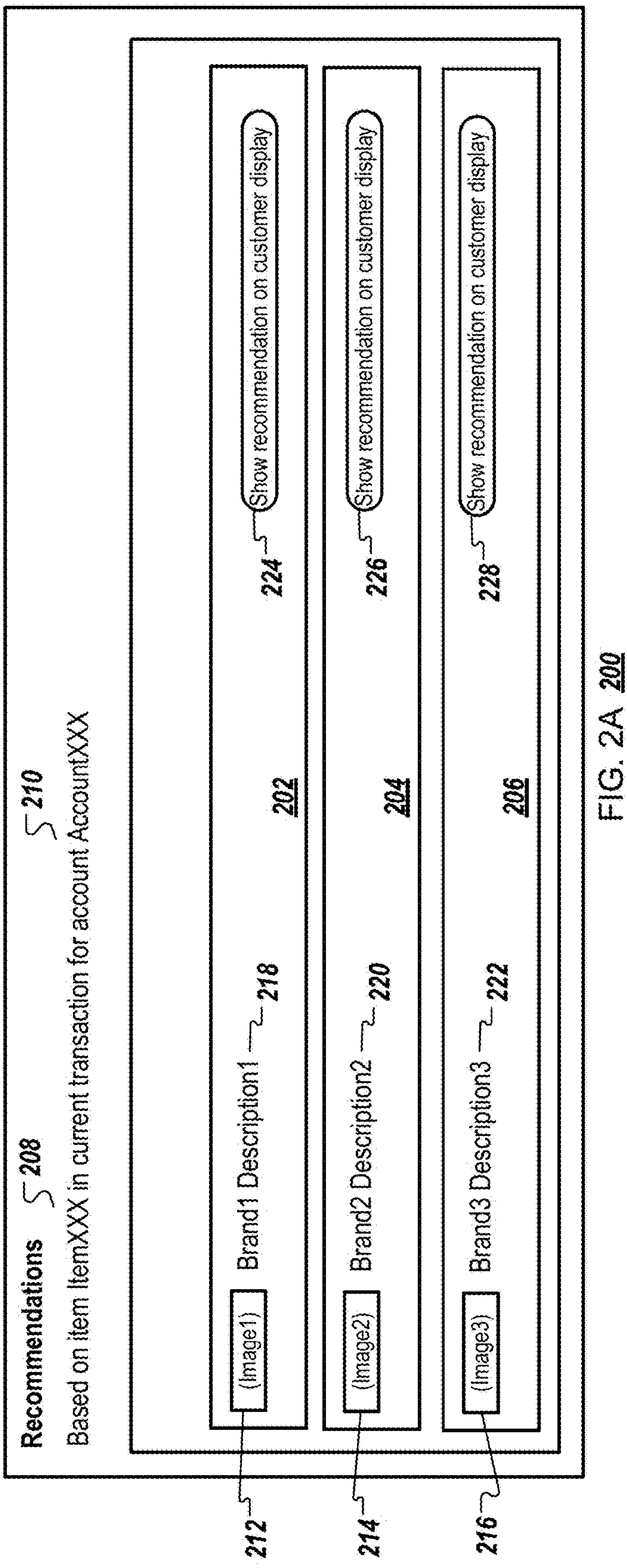
FIGS. 2A-2B illustrate example recommendation user interfaces.
Figure 2B:
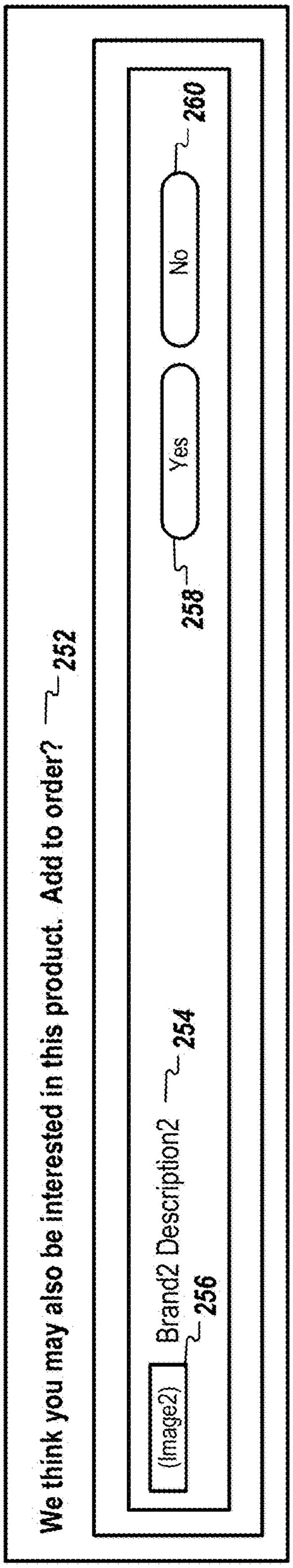

In some examples, the recommendation engine 130 directly provides information for the selected item 136 that has been automatically selected by the recommendation engine 130 for presentation in the customer user interface 140 (e.g., without requiring employee selection of a recommended item). The customer/user can inform the employee if the selected item 136 is desired (or can select the presented recommended item in the customer user interface 140 as described above). In some examples, the recommendation engine 130 directly provides information for multiple of the in-stock subset 134 for presentation in the customer user interface 140 (e.g., without requiring employee selection). The customer/user can inform the employee if any of the presented items are desired. In some cases, the recommendation engine 130 provides information for either the selected item 136 automatically selected by the recommendation engine 130 or multiple of items in the in-stock subset 134 for simultaneous presentation on both the employee user interface 138 and the customer user interface 140. Either or both of the employee or the customer/user can select a presented recommended item on a respective display, possibly depending on results of a verbal exchange. Example recommendation user interfaces are shown in FIGS. 2A-2B and are described below.

Other entities other than the entity A 104, such as the entity B 106, can also send recommendation requests to the central system 102. As mentioned, the entity B 106 has different data in the local database 114 as compared to the local database 112 of the entity A 104, including for different items and even for similar or same items, possibly different inventory counts (e.g., corresponding to physical stock 144 at the entity B 106). Accordingly, a recommendation engine 145 of a POS system 146 of the entity B 106 can generate and provide information for presentation of recommendations that are relevant to people at the entity B 106 (e.g., even when recommendations received from the central system 102 include some information for items not known to or not in stock at the entity B 106). This can occur similar to the process described above for the entity A 104.

Information in the local database 112 of the entity A 104 and the local database 114 of the entity B 106 can be synchronized based on contents of the central database 110 on a periodic and/or event-driven basis, for example. This synchronization can occur separately (e.g., disjointly) for at least some entities, in parallel (e.g., according to a schedule), or any combination of both (e.g., for different entities). Database updaters 148 and 149 of the entity A 104 and the entity B 106, respectively, can interact with a database engine 150 of the central system 102 for information synchronization, for example. In some cases, information synchronization can occur in response to a given entity offering a new item or product, or in response to other inventory activities, such as receiving updated information for items. In some cases, a given entity generates or receives a manifest of items for which information synchronization is to be performed.

In some examples, a manifest, or information from a manifest, is provided to the central system by a given entity in or as a request for information synchronization. For instance, the database updater 149 can send a request 152 that includes a copy of a manifest 153 (or information from the manifest 153) to the central system 102. In this example, the request 152 includes item names of Item9, Item10, and Item12 that are now available at the entity B 106. Item10 and Item12 correspond to local identifiers of I-333 and I-555, respectively. The request 152 might not include local identifiers because the central system 102 is not aware of local identifiers used by the entity B 106.

The local database 114 shows entries for the Item10/I-333 and Item12/I-555 items. Those entries can be updated by the synchronization process. In some examples, entries for at least some items are not present when the synchronization process begins but are added during the synchronization process. For example, the local database 114 does not currently include an entry for an Item9 item. The entry for the Item12/I-555 item currently has no global identifier value. A global identifier value (and possibly other information) can be populated in the entry for the Item12/I-555 item as part of the synchronization process. The Item10/I-333 item is shown with a shaded G992 global identifier value. The global identifier value in this entry is shaded to illustrate that the global identifier value is populated for the Item10/I-333 item as part of the synchronization process for that item, as described below.

In general, the request 152, for a given item, represents a request for additional information from the central system 102 for storing an entry in the local database 114 for the item. As mentioned, the request 152 can include item names (e.g., Item9, Item10, Item12) that can be used by the central system 102 to identify additional information for those items. In some examples, the request 152 includes other information common to items in the request 152. For instance, the manifest 153 may have been received by the entity B 106 from a vendor associated with a brand, such as when the vendor has begun providing items for offer by the entity B 106. Since all items in the manifest 153 in this example are associated with a same brand, an indication of the brand can be included in the request 152.

The central system 102 can receive the request 152 over the network 108 as a request 156. Although the request 152 and the request 156 are shown as corresponding to multiple items, in some implementations, separate requests are sent to the central system 102 for each item (e.g., each item in a manifest). The database engine 150 can search the central database 110 to identify candidate data objects (e.g., candidate items for which information is stored in the central database 110) that may correspond to a given item in the request 156 and therefore may include additional information relevant to the request item and useful for the entity B 106. When the request 156 includes common information (e.g., a common type) common to all items in the request (such as a brand), the database engine 150 can identify that common information and use that common information during the search.

For a given request item, the database engine 150 can perform a similarity search, for example, using item information (e.g., an item name) in the request 156. The database engine 150 can determine, for each item in the request 156 and each item in the central database 110, a similarity score for the item in the central database 110 that indicates a likelihood that the item in the central database 110 corresponds to the item in the request 156.

The database engine 150 can generate, for each request item, a list of one or more candidate data objects for the item along with predetermined data for the candidate data objects from the central database 110. The predetermined data for a candidate data object can include a global identifier and possibly other information, such as item/product type, size, category, image, brand etc. As an example, the database engine 150 can generate a response 158 for the Item10 item that includes the candidate data objects (and corresponding candidate data object information) identified for the Item10 item and possibly a similarity score for each identified candidate object item.

The central system 102 can send the response 158 to the entity B 106 in response to the request 152. The entity B 106 can receive the response 158 as a response 160. The central system 102 can generate responses for other request items, and can send request item responses to the entity B 106, either separately or in an aggregate response message.

The database updater 149 can receive and process the response 160 for the Item10 item. For example, the database updater 149 can process candidate data objects 162 that are included in the response 160. In some cases, candidate data objects 162 for which a similarity score does not satisfy, e.g., is below, a threshold set by the database updater 149 can be filtered from further processing. In some examples, the database engine 150 can perform similarity score thresholding to exclude candidate data objects with similarity scores that do not satisfy, e.g., less than, a threshold set by the database engine 150 from being included in the response 160. In some examples, the database engine 150 and the database updater 149 use different thresholds (e.g., the database updater 149 may use a more strict threshold than the database engine 150).

In some examples, the database updater 149 can automatically determine an entry in the local database 114 that corresponds to a given candidate data object in the candidate data objects 162. For instance, in some cases, the request 152 can include a request for an item for which the local database 114 already has a global identifier. The database updater 149 can determine that a given entry in the local database 114 has a same global identifier as one of the candidate data objects 162 and can update the entry with any information in the candidate data object that is not already included in the entry in the local database 114.

In some examples, the database updater 149 can determine a similarity score for each candidate data object and each entry in the local database 114 that indicates a likelihood of the candidate data object corresponding to the entry. If the similarity score for the candidate data object and the entry satisfies, e.g., exceeds, a particular threshold (e.g., indicating a particularly high likelihood that the candidate data object corresponds to the entry), the database updater 149 can automatically update the entry using information from the candidate data object. In some cases, the database updater 149 determines that a similarity score in the response 160 for a candidate data object satisfies, e.g., exceeds, a threshold (e.g., indicating a particularly high likelihood that the candidate data object corresponds to a certain request item, such as a request item with a certain name). The database updater 149 can determine that an entry in the local database 114 also matches the name of the request item with a particular likelihood that satisfies a likelihood threshold, e.g., is a high value. Based on one or both likelihoods, the database updater 149 can automatically identify and update the entry in the local database 114 using information in the candidate data object.

Figure 3:
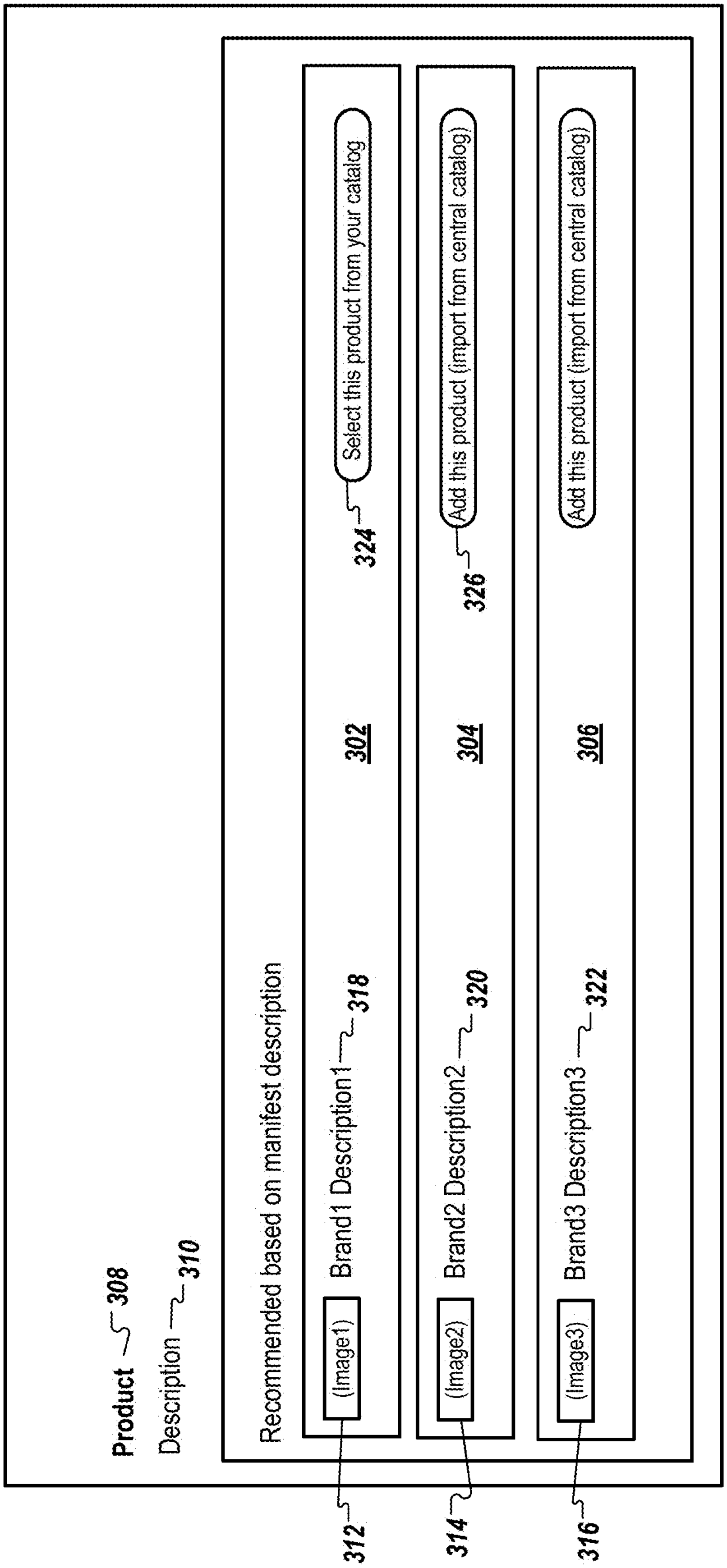
FIGS. 3-4 illustrate example synchronization user interfaces.
Figure 4:
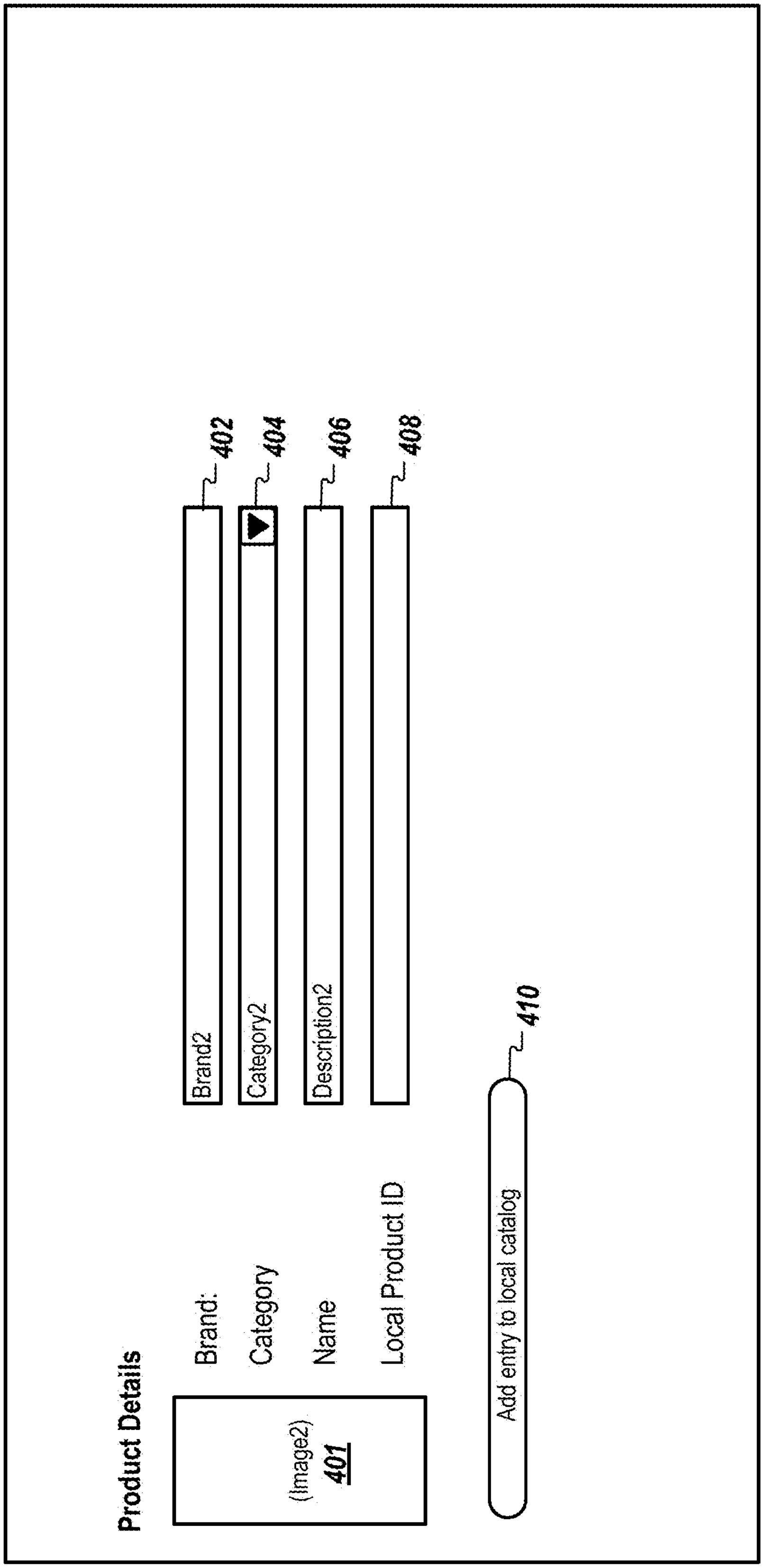

In some examples, the database updater 149 can provide candidate data object information for presentation in an employee user interface 164 on an employee display 166 for requesting user/employee selection of an appropriate candidate data object that corresponds to a given request item. The employee user interface 164 can present candidate data object information for an item. In some examples, the employee user interface 164 can indicate, for a given candidate data object, whether the database updater 149 has determined the candidate data object likely already has a corresponding entry in the local database 114 (in which case the employee can be prompted to update the entry with candidate data object information) or whether an entry likely doesn't yet exist in the local database 114 that corresponds to the candidate data object (in which case the employee can be prompted to add a new entry in the local database 114). Example employee user interfaces are shown in FIGS. 3 and 4 and are described below.

For an example of the Item10/I-333 item, the database updater 149 selects (either automatically or based on receiving a corresponding user input in the employee user interface 164) a selected candidate data object 168 with a global identifier of G992. The database updater can update, e.g., during a database entry/update process 170, the Item10/I-333 entry in the local database 114 to include the G992 global identifier (and possibly also other information in the selected candidate data object 168). Once the Item10/I-333 entry in the local database 114 includes the G992 global identifier, the entity B 106 can include the global identifier in future requests sent to the central system 102 (e.g., in recommendation requests sent by the recommendation engine 145).

FIG. 2A illustrates an example recommendation user interface 200. The user interface 200 may be an interface displayed on an employee-facing terminal of a POS system in a checkout area of an entity, for example. The user interface 200 includes a set of recommendations for products that have been recommended by a central system and that are also available at the entity. In some examples, the user interface 200 includes a set of recommendations that have been recommended by the central system, which are available at the entity, and which have been further filtered based on automatic filtering by the POS system. The user interface 200 includes a first recommendation 202 for a first product, a second recommendation 204 for a second product, and a third recommendation 206 for a third product. Although the user interface 200 includes multiple recommended products, in some examples, the user interface 200 may include a single recommended product that has been automatically selected by the POS system from a set of candidate products recommended by the central system.

The recommended products may be recommended at least based on an item 208 that is part of a current transaction and/or based on other information known by the central system (or the POS system) for an account identifier 210 for the current transaction). At least some recommendations 202, 204, and 206 can include a corresponding respective recommended product image 212, 214, or 216, recommended product brand and description text 218, 220, or 222, and a show-on-customer-display button 224, 226, or 228, respectively.

A user of the user interface 200 (e.g., an employee at a checkout area) can select the show-on-customer-display button 224, 226, or 228 to cause presentation of a recommendation on a user interface of a customer-facing terminal of the POS (e.g., in the checkout area). In some instances, the user interface with which the recommendation is presented can be presented by another type of device, e.g., as part of an application executing on a client device that receives a message from the employee-facing terminal of the POS system.

FIG. 2B illustrates an example user interface 250. The user interface 250 may be presented on a customer-facing terminal of a POS in a checkout area, for example, or any other appropriate type of device. The user interface 250 may be presented in response to a user input by an employee on a user interface displayed on an employee-facing terminal of the POS in the checkout area, for example. For instance, the user interface 250 may be displayed on a portion of the customer-facing terminal in response to an employee selection of the show-on-customer-display button 226 of FIG. 2A.

The user interface 250 includes a prompt 252 that communicates to the customer that the entity believes the customer may be interested in a product corresponding to presented product brand and description information 254. An image 256 of the product can also be shown to the customer. In some examples, the user interface 250 can include a Yes button 258 or a No button 260. Receipt of data indicating selection of a corresponding button 258, 260 can communicate to the employee-facing terminal whether the customer is interested in the recommended product. The customer can verbally provide an answer to the employee. If the customer is interested in the recommended product, the product can be retrieved and added to the order.

FIG. 3 illustrates an example synchronization user interface 300. The user interface 300 may be an interface displayed on an employee-facing terminal of a POS system, in response to a local-central database synchronization, for example. The user interface 300 may be displayed for a particular manifest item of a set of manifest items submitted by an entity to a central system. The user interface 300 includes product recommendations 302, 304, and 306 that are closest matches of products in a central database for a product 308 of a synchronization request, for example. The product 308 may correspond to a manifest item having a description 310, for example. The description may be an item/product name.

Each product recommendation 302, 304, and 306 can include a corresponding respective recommended product image 312, 314, or 316, and recommended product brand and description text 318, 320, or 322, respectively. A given product recommendation, such as the product recommendation 302, can include a select-product button 324. The inclusion of the select-product button 324 in the product recommendation 302 can indicate that the POS system has determined that a product with brand and description text 318, as a product recommended by the central system as a match to the product 308, corresponds to an existing entry in the local database. The user (e.g., an employee or administrator of the entity) can select the select-product button 324 to confirm that the product with brand and description text 318 matches the product 308. In response to selection of the select-product button 324, the entry in the local database can be updated with information received from the central system for the product recommendation 302 that is not already stored in the local entry.

A given product recommendation, such as the product recommendation 304, can include an add-product button 326. The inclusion of the add-product button 326 in the product recommendation 304 can indicate that a product with brand and description text 320 may be a match for the product 308 but that an entry for the product 308 (and correspondingly, the product with brand and description text) has not been located in a local database of the POS. The user (e.g., an employee or administrator of the entity) can select the add-product button 326 to add an entry in the local database for the product 308/the product with brand and descriptive text 320.

FIG. 4 illustrates an example synchronization user interface 400. The user interface 400 can be displayed, for example, in response to an add-product button (e.g., the add-product button 326 of FIG. 3) for adding an entry to a local database for a recommended product identified as a match for a product for which a local entity sent a request to a central system for additional information. The user interface 400 includes a product image 401 of the recommended product. The user interface 400 also includes a brand field 402, a category field 404, a name field 406, and a local product identifier field 408.

The brand field 402, the category field 404, and the name field 406 are pre-populated with field data from respective fields of the recommended product identified by the central system. The user interface 400 enables the user to enter information for any fields for which the central system does not know field information. For example, the central system in this example does not know a local product identifier used by a local entity for which the recommendation was generated. Accordingly, an entity user can provide (e.g., enter) a local product identifier into the local product identifier field 408. The user can select an add entry button 410 to cause an entry to be created in the local database for the product, using product data of the product recommended by the central system and any user-entered information.

In some examples, a manifest received by the central system may include a item/product that does not yet exist in the respective local database or have a matching item in the central database. The user interface 400 (or another user interface) can be presented to a user of the entity that sent the manifest to enable entry/confirmation of information for creation of a new item that is initially stored in the local database (e.g., without a stored global identifier). The central system can subsequently perform a process that can identify this new item (e.g., as part of a database/catalog synchronization). In response to identification of the new item, the central system can trigger a workflow that results in creation of a corresponding item in the central database with an assigned global identifier. A subsequent local/central database synchronization can cause population of the global identifier in the local database entry for the item (perhaps along with population in the local entry of data for the item now stored at the central database).

Figure 5:
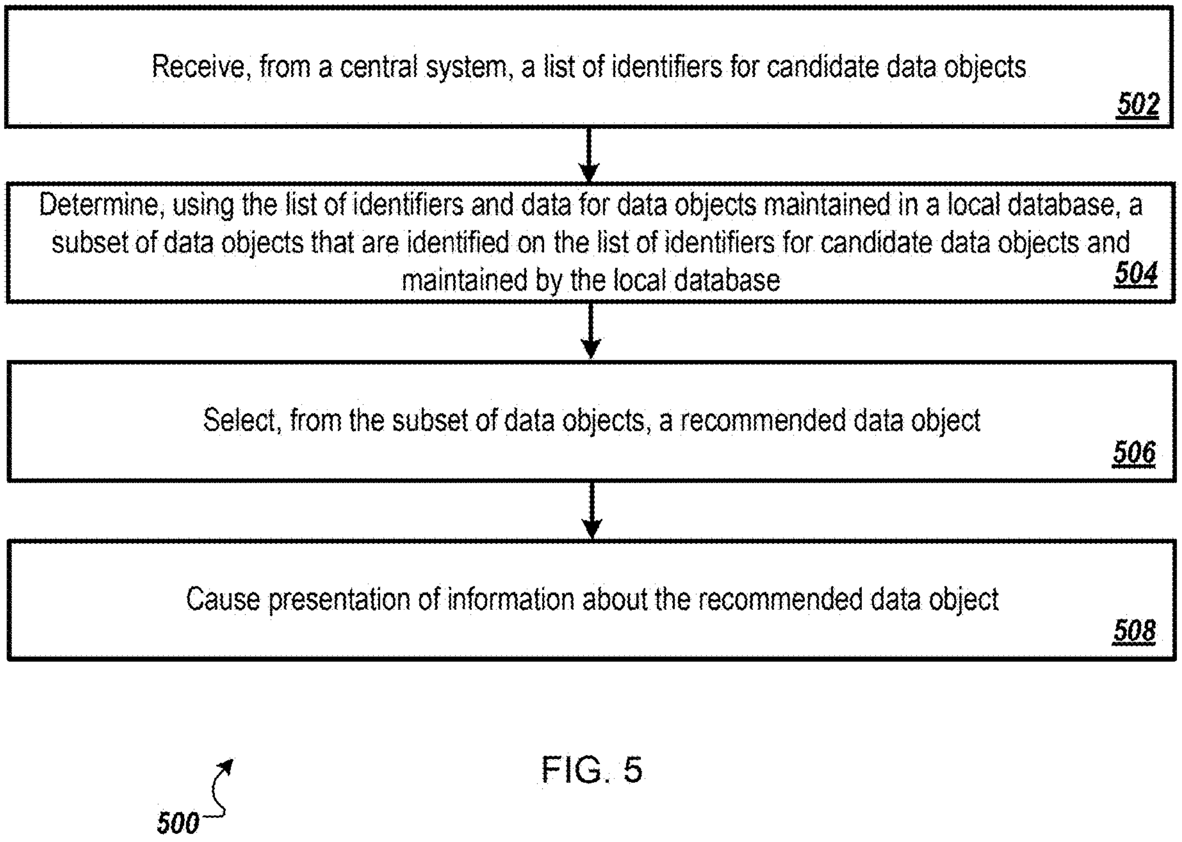
FIG. 5 is a flow diagram of an example process for filtering recommendations based on local relevance.

FIG. 5 is a flow diagram of an example process 500 for filtering recommendations based on local relevance. For example, the process 500 can be performed by the entity A 104 or the entity B 106 as entity examples.

An entity receives, from a central system, a list of identifiers for candidate data objects (502). The list of identifiers can be a list of global identifiers for the central system.

The entity determines, using the list of identifiers and data for data objects maintained in a local database, a subset of data objects that are identified on the list of identifiers for candidate data objects and maintained by the local database (504). Each data object maintained in the local database can include data for a corresponding item provided by the entity. The entity can maintain the local database, for example. The local database can be or include an inventory database for the entity and at least some of the items represented by the data objects in the local database can be in stock at a physical location for the entity.

Determining the subset of data objects can include: determining, for at least some identifiers from the global list of identifiers, a corresponding local identifier using a mapping of global identifiers for the central system to local identifiers for the local database; determining, using the local identifiers that were mapped to corresponding global identifiers from the list of global identifiers and data from the local database, whether an item for the corresponding local identifier is in stock at a physical location for an entity that maintains the local database; and selecting, as the subset of data objects, the data objects for the items that are in stock at the physical location for the entity.

The entity selects, from the subset of data objects, a recommended data object (506). Selecting the recommended data object can include receiving data indicating selection, in a user interface, of the recommended data object from the subset of data objects. Selecting the recommended data object from the subset of data objects can include selecting based on data for the entity that maintains the local database. Selecting the subset can include selecting based on one or more of a list of items with which an item represented by the recommended data object is offered, historical online item interaction data, historical transaction data for a physical location, or a device identifier for which the list of identifiers was received.

The entity causes presentation of information about the recommended data object (508). The information about the recommended data object can be presented on a first display, such as an employee-facing terminal. After causing presentation of the information about the recommended data object on the first display, data can be received that indicates selection of a menu option to present the information about the recommended data object on a second, different display. The second display can be a customer-facing display, for example. The information about the recommended data object can be presented on the second, different display.

Figure 6:
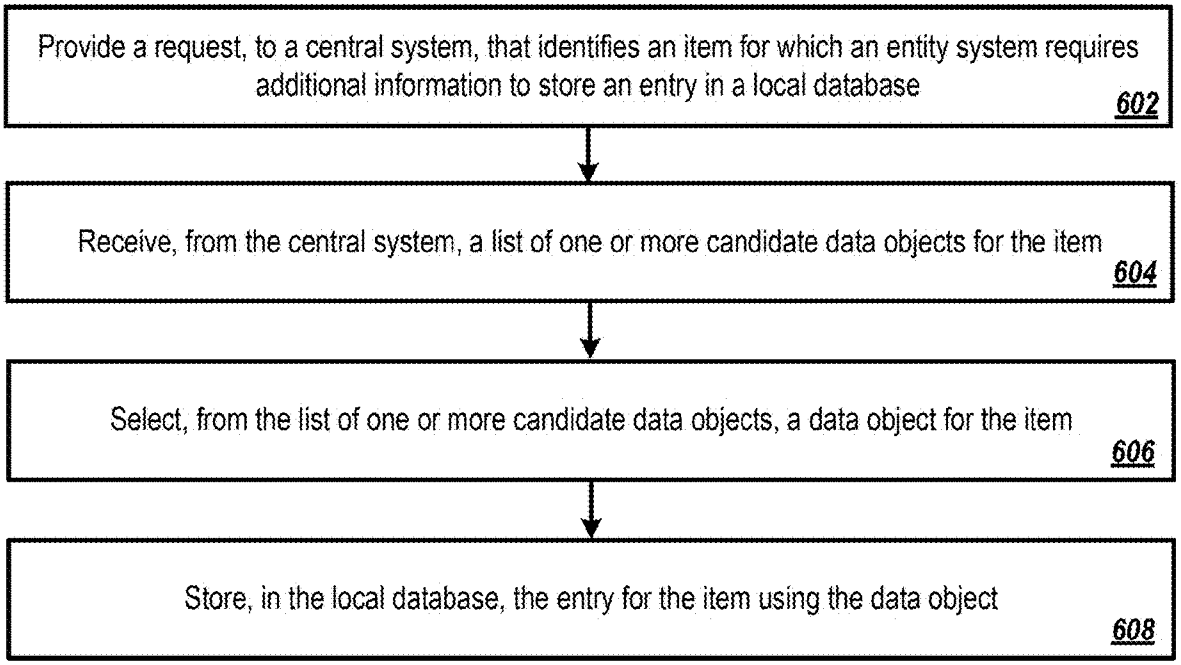
FIG. 6 is a flow diagram of an example process for storing an entry in a local database based on information received from a central system.

FIG. 6 is a flow diagram of an example process 600 for storing an entry in a local database based on information received from a central system. For example, the process 600 can be performed by systems for the entity A 104 or the entity B 106 as entity examples.

An entity system provides, to a central system that maintains a database of data objects used by a plurality of entity systems each of which maintain a corresponding local database, a request that identifies an item for which the entity system requires additional information to store an entry in a local database (602). The item may be among a plurality of items included in a manifest, for example. The local database for the entity can maintain entries for one or more first data objects that are different data objects than one or more second data objects used for entries in a second, different database for a second, different entity that is a different entity than the first entity. Each data object maintained in the local database can include data for a corresponding item provided by the entity. The local database of the entity can be or include an inventory database for the entity. At least some of the items represented by the data objects in the local database can be in stock at a physical location for the entity.

In response to providing the request, the entity system receives, from the central system, a list of one or more candidate data objects for the item, where each of the candidate data objects include different predetermined data for a corresponding data object (604). In some examples, each of the one or more candidate data objects on the list has a common type that was determined using the request. The common type may correspond to a brand, product type, or both, indicated in the request. The brand can correspond to a brand that supplied a manifest of products, for example. Receiving the list can include receiving candidate data objects that i) were determined using a description of the item as a search parameter in the database of the central system and ii) that satisfied a confidence criterion that the corresponding data object includes predetermined data for the item.

The entity system selects, from the list of one or more candidate data objects, a data object for the item (606). Selecting the data object from the list of one or more candidate data objects can include determining that a global identifier from the central system and for the data object maps to a local identifier for the local database. Selecting the data object from the list of one or more candidate data objects can include determining that a name for the item satisfies a similarity criterion for a data object name included in the data object. The name can be an item name or a brand name. In some examples, selecting the data object from the list of one or more candidate data objects can include receiving input data that identifies a selection of the data object from the list of one or more candidate data objects.

The entity system stores, in the local database, the entry for the item using the data object (608). In some examples, input data for a given field can be determined or identified, for one or more fields for which the data object does not include predetermined data. Determining the input data can include receiving the input data from an input device. Storing the entry for the item in the local database can include using the data object, the predetermined data, and the input data.

For situations in which the systems discussed here collect personal information about users or user accounts, or may make use of personal information, the users may be provided with an opportunity to control whether programs or features collect personal information (e.g., information about a user's social network, social actions or activities, profession, a user's preferences, or a user's current location), or to control whether and/or how to receive content that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine", "monitor" (other than display type monitors), "generator", "detector", and "API implementation," are used broadly to refer to a software-based system, subsystem, or process that is programmed to perform one or more specific functions. Generally, these components will be implemented as one or more software modules or components, installed on one or more computers in one or more locations. In some instances, one or more computers will be dedicated to a particular component. In some instances, multiple components can be installed and running on the same computer or computers.

A number of implementations have been described. Nevertheless, it will be understood that various modifications may be made without departing from the spirit and scope of the disclosure. For example, various forms of the flows shown above may be used, with steps re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 7:
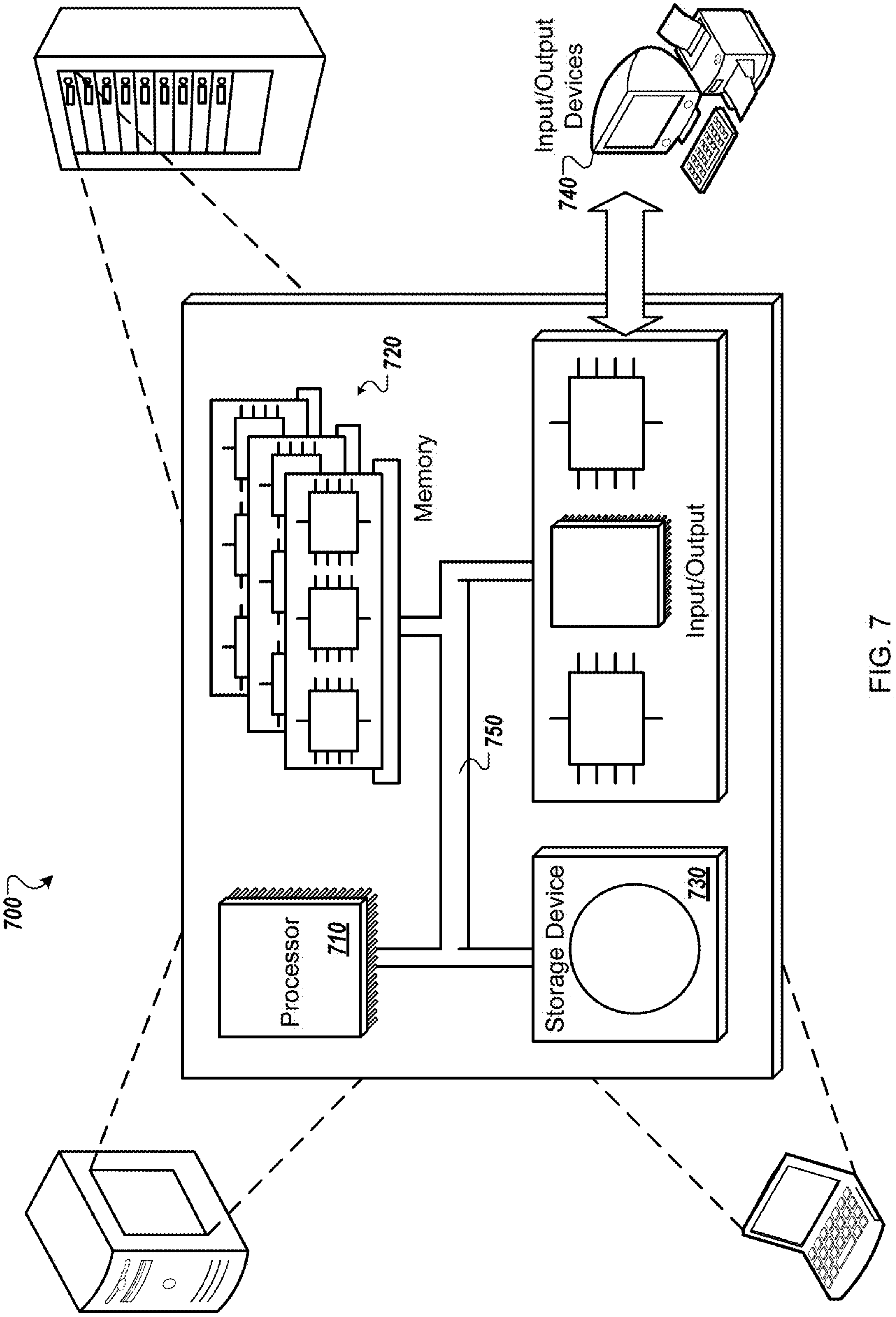
FIG. 7 is a block diagram of a computing system that can be used in connection with computer-implemented methods described in this specification.

An example of one such type of computer is shown in FIG. 7, which shows a schematic diagram of a computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In one implementation, the memory 720 is a volatile memory unit. In some implementations, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In some implementations, the input/output device 740 includes a keyboard and/or pointing device. In some implementations, the input/output device 740 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:

by a local system that includes i) a local database that maintains local identifiers and global identifiers for data objects, and ii) implements a local database updater:

generating, in the local database, a data object for a new product and that includes a product name and a local identifier;

transmitting, to a central system that is remote from the local system, a database synchronization request for the new product, the data object comprising more data for the new product than the database synchronization request;

in response to transmitting the database synchronization request for the new product, receiving, from the central system, a first list of candidate data objects that each satisfy a first similarity criterion for the new product and was computed by the central system using data from the data synchronization request;

filtering, from the list of candidate data objects and using data from the data object, one or more first candidate data objects that do not satisfy a second similarity criterion for the new product to generate a second list of candidate data objects;

detecting, by the local database updater and in the second list of candidate data objects, a particular candidate data object for the new product;

updating, by the local database updater and in the local database, the data object for the new product using a global identifier for the new product that was received from the central system;

receiving, from the central system that is remote from the local system, a list of global identifiers a) for a plurality of candidate data objects, b) that is specific to the central system, and c) that includes a proper subset of a plurality of global identifiers maintained by the central system;

filtering the list of global identifiers to include a subset of global identifiers each of which the local database maintains a corresponding data object in the data objects, the subset of the global identifiers corresponding to a subset of data objects that are identified on the list of global identifiers for candidate data objects and maintained by the local database, the filtering using a mapping, maintained by the local system, of global identifiers for the central system to local identifiers for the local database, and comprising:

determining, for at least some identifiers from the list of global identifiers and each identifier of which is for a corresponding candidate data object, a corresponding local identifier for the candidate data object in the local database that matches a local identifier in the mapping of global identifiers for the central system to local identifiers for the local database;

determining, using the local identifiers that were mapped to corresponding global identifiers from the list of global identifiers and data from the local database, whether an item for the corresponding local identifier is in stock at a physical location for an entity that maintains the local database; and selecting, as the subset of data objects and from a plurality of local identifiers maintained by the local database using results of the determinations, data objects for which a global identifier is mapped to a corresponding local identifier and a corresponding item is in stock at a physical location for an entity that maintains the local database, wherein the selected data objects comprise a proper subset of the plurality of candidate data objects and excludes items that are not in stock;

retrieving, from the subset of data objects in the local database, a particular data object that includes additional data that was not included in the list of global identifiers; and causing presentation of information about the particular data object.

2. The computer-implemented method of claim 1, further comprising:

after causing presentation of the information about the particular data object on a first display, receiving data indicating selection of a menu option to present the information about the particular data object on a second, different display; and causing presentation of the information about the particular data object on the second, different display.

3. The computer-implemented method of claim 1, comprising receiving, via a user interface, input data identifying the particular data object from the subset of data objects, wherein retrieving the particular data object from the subset of data objects in the local database uses the input data.

4. The computer-implemented method of claim 1, wherein retrieving the particular data object from the subset of data objects uses data for an entity that maintains the local database.

5. The computer-implemented method of claim 1, wherein retrieving the particular data object from the subset of data objects uses at least one of a list of items with which an item represented by the particular data object is offered, historical online item interaction data, historical transaction data for a physical location, or a device identifier for which the list of global identifiers was received.

6. The computer-implemented method of claim 1, wherein:

each data object maintained in the local database includes data for a corresponding item provided by an entity that maintains the local database; and the local database comprises an inventory database for the entity and at least some items represented by the data objects in the local database are in stock at a physical location for the entity.

7. The method of claim 1, wherein:

the list of global identifiers for candidate data objects is maintained by the central system for use by a plurality of local systems that includes the local system; and at least two of the plurality of local systems have different local identifiers mapped to a same global identifier.

8. The method of claim 1, comprising:

accessing first data from the central system and for the particular data object; and retrieving, from the local database, second data for the particular data object, wherein causing presentation of the information about the particular data object uses the first data and the second data.

9. The method of claim 1, wherein generating the data object for the new product creates the data object with the local identifier without including any global identifier.

10. One or more non-transitory computer storage media encoded with instructions that, when executed by one or more computers, cause the one or more computers to perform operations comprising:

by a local system that includes i) a local database that maintains local identifiers and global identifiers for data objects, and ii) implements a local database updater:

generating, in the local database, a data object for a new product and that includes a product name and a local identifier;

transmitting, to a central system that is remote from the local system, a database synchronization request for the new product, the data object comprising more data for the new product than the database synchronization request;

in response to transmitting the database synchronization request for the new product, receiving, from the central system, a first list of candidate data objects that each satisfy a first similarity criterion for the new product and was computed by the central system using data from the data synchronization request;

filtering, from the list of candidate data objects and using data from the data object, one or more first candidate data objects that do not satisfy a second similarity criterion for the new product to generate a second list of candidate data objects;

detecting, by the local database updater and in the second list of candidate data objects, a particular candidate data object for the new product;

updating, by the local database updater and in the local database, the data object for the new product using a global identifier for the new product that was received from the central system;

receiving, from the central system that is remote from the local system, a list of global identifiers a) for a plurality of candidate data objects, b) that is specific to the central system, and c) that includes a proper subset of a plurality of global identifiers maintained by the central system;

filtering the list of global identifiers to include a subset of global identifiers each of which the local database maintains a corresponding data object in the data objects, the subset of the global identifiers corresponding to a subset of data objects that are identified on the list of global identifiers for candidate data objects and maintained by the local database, the filtering using a mapping, maintained by the local system, of global identifiers for the central system to local identifiers for the local database, and comprising:

determining, for at least some identifiers from the list of global identifiers and each identifier of which is for a corresponding candidate data object, a corresponding local identifier for the candidate data object in the local database that matches a local identifier in the mapping of global identifiers for the central system to local identifiers for the local database;

determining, using the local identifiers that were mapped to corresponding global identifiers from the list of global identifiers and data from the local database, whether an item for the corresponding local identifier is in stock at a physical location for an entity that maintains the local database; and selecting, as the subset of data objects and from a plurality of local identifiers maintained by the local database using results of the determinations, data objects for which a global identifier is mapped to a corresponding local identifier and a corresponding item is in stock at a physical location for an entity that maintains the local database, wherein the selected data objects comprise a proper subset of the plurality of candidate data objects and excludes items that are not in stock;

retrieving, from the subset of data objects in the local database, a particular data object that includes additional data that was not included in the list of global identifiers; and causing presentation of information about the particular data object.

11. The computer storage media of claim 10, the operations further comprising:

after causing presentation of the information about the particular data object on a first display, receiving data indicating selection of a menu option to present the information about the particular data object on a second, different display; and causing presentation of the information about the particular data object on the second, different display.

12. The computer storage media of claim 10, the operations comprising receiving, via a user interface, input data identifying the particular data object from the subset of data objects, wherein retrieving the particular data object from the subset of data objects in the local database uses the input data.

13. The computer storage media of claim 10, wherein retrieving the particular data object from the subset of data objects uses at least one of a list of items with which an item represented by the particular data object is offered, historical online item interaction data, historical transaction data for a physical location, or a device identifier for which the list of global identifiers was received.

14. The computer storage media of claim 10, wherein:

each data object maintained in the local database includes data for a corresponding item provided by an entity that maintains the local database; and the local database comprises an inventory database for the entity and at least some items represented by the data objects in the local database are in stock at a physical location for the entity.

15. A local system comprising one or more computers and one or more storage devices on which are stored instructions that are operable, when executed by the one or more computers, to cause the one or more computers to perform operations comprising:

by the local system that includes i) a local database that maintains local identifiers and global identifiers for data objects, and ii) implements a local database updater:

generating, in the local database, a data object for a new product and that includes a product name and a local identifier;

transmitting, to a central system that is remote from the local system, a database synchronization request for the new product, the data object comprising more data for the new product than the database synchronization request;

in response to transmitting the database synchronization request for the new product, receiving, from the central system, a first list of candidate data objects that each satisfy a first similarity criterion for the new product and was computed by the central system using data from the data synchronization request;

filtering, from the list of candidate data objects and using data from the data object, one or more first candidate data objects that do not satisfy a second similarity criterion for the new product to generate a second list of candidate data objects;

detecting, by the local database updater and in the second list of candidate data objects, a particular candidate data object for the new product;

updating, by the local database updater and in the local database, the data object for the new product using a global identifier for the new product that was received from the central system;

receiving, from the central system that is remote from the local system, a list of global identifiers a) for a plurality of candidate data objects, b) that is specific to the central system, and c) that includes a proper subset of a plurality of global identifiers maintained by the central system;

filtering the list of global identifiers to include a subset of global identifiers each of which the local database maintains a corresponding data object in the data objects, the subset of the global identifiers corresponding to a subset of data objects that are identified on the list of global identifiers for candidate data objects and maintained by the local database, the filtering using a mapping, maintained by the local system, of global identifiers for the central system to local identifiers for the local database, and comprising:

determining, for at least some identifiers from the list of global identifiers and each identifier of which is for a corresponding candidate data object, a corresponding local identifier for the candidate data object in the local database that matches a local identifier in the mapping of global identifiers for the central system to local identifiers for the local database;

determining, using the local identifiers that were mapped to corresponding global identifiers from the list of global identifiers and data from the local database, whether an item for the corresponding local identifier is in stock at a physical location for an entity that maintains the local database; and selecting, as the subset of data objects and from a plurality of local identifiers maintained by the local database using results of the determinations, data objects for which a global identifier is mapped to a corresponding local identifier and a corresponding item is in stock at a physical location for an entity that maintains the local database, wherein the selected data objects comprise a proper subset of the plurality of candidate data objects and excludes items that are not in stock;

retrieving, from the subset of data objects in the local database, a recommended particular data object that includes additional data that was not included in the list of global identifiers; and causing presentation of information about the recommended particular data object.

16. The system of claim 15, the operations further comprising:

after causing presentation of the information about the particular data object on a first display, receiving data indicating selection of a menu option to present the information about the particular data object on a second, different display; and causing presentation of the information about the particular data object on the second, different display.

17. The system of claim 15, the operations comprising receiving, via a user interface, input data identifying the particular data object from the subset of data objects, wherein retrieving the particular data object from the subset of data objects in the local database uses the input data.

18. The system of claim 15, wherein retrieving the recommended particular data object from the subset of data objects uses data for an entity that maintains the local database.

19. The system of claim 15, wherein retrieving the particular data object from the subset of data objects uses at least one of a list of items with which an item represented by the particular data object is offered, historical online item interaction data, historical transaction data for a physical location, or a device identifier for which the list of global identifiers was received.

20. The system of claim 15, wherein:

each data object maintained in the local database includes data for a corresponding item provided by an entity that maintains the local database; and the local database comprises an inventory database for the entity and at least some items represented by the data objects in the local database are in stock at a physical location for the entity.

21. The system of claim 15, wherein:

the list of global identifiers for candidate data objects is maintained by the central system for use by a plurality of local systems that includes the local system; and at least two of the plurality of local systems have different local identifiers mapped to a same global identifier.

22. The system of claim 15, the operations comprising:

accessing first data from the central system and for the particular data object; and retrieving, from the local database, second data for the particular data object, wherein causing presentation of the information about the particular data object uses the first data and the second data.

* * * * *